(12) United States Patent
Hasui

(10) Patent No.: US 8,582,168 B2
(45) Date of Patent: Nov. 12, 2013

(54) IMAGE PROCESSING APPARATUS AND PROCESSING METHOD THEREOF

(75) Inventor: Shigeki Hasui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 12/975,834

(22) Filed: Dec. 22, 2010

(65) Prior Publication Data

US 2011/0157608 A1 Jun. 30, 2011

(30) Foreign Application Priority Data

Dec. 25, 2009 (JP) ................................. 2009-296380

(51) Int. Cl.
*G06K 15/02* (2006.01)
(52) U.S. Cl.
USPC .......... 358/1.2; 358/3.26; 358/3.27; 358/501; 358/525; 358/539; 358/1.1; 358/1.15; 382/299; 382/274; 382/275; 382/260; 382/254; 382/276; 382/232
(58) Field of Classification Search
None
See application file for complete search history.

(56) References Cited

U.S. PATENT DOCUMENTS

| 7,876,357 | B2 * | 1/2011 | Jung et al. .................. 348/207.1 |
| 2006/0126952 | A1 * | 6/2006 | Suzuki et al. ................. 382/233 |
| 2009/0027546 | A1 * | 1/2009 | Jung et al. ..................... 348/372 |
| 2009/0148059 | A1 * | 6/2009 | Matsuda ....................... 382/251 |
| 2009/0161992 | A1 * | 6/2009 | Taguchi et al. ............... 382/299 |
| 2010/0054338 | A1 * | 3/2010 | Suzuki et al. ............ 375/240.16 |
| 2011/0110608 | A1 * | 5/2011 | Jung et al. ..................... 382/299 |

FOREIGN PATENT DOCUMENTS

JP 2004-104621 A 4/2004

* cited by examiner

*Primary Examiner* — Hilina L Demeter
(74) *Attorney, Agent, or Firm* — Fitzpatrick, Cella, Harper & Scinto

(57) ABSTRACT

An image processing apparatus stores pixel data of an input image in a storage apparatus after performing resolution conversion encoding, and performs a pixel interpolation process after reading out the pixel data stored in the storage apparatus and performing resolution conversion decoding. The image processing apparatus determines, when resolution conversion encoding the pixel data of the input image, whether a resolution of the pixel data will decrease due to the pixel interpolation process, based on attribute information indicating an attribute of the pixel data, and performs processing to decrease the resolution of the pixel data in the resolution conversion encoding, if it is determined that the resolution will decrease.

4 Claims, 9 Drawing Sheets

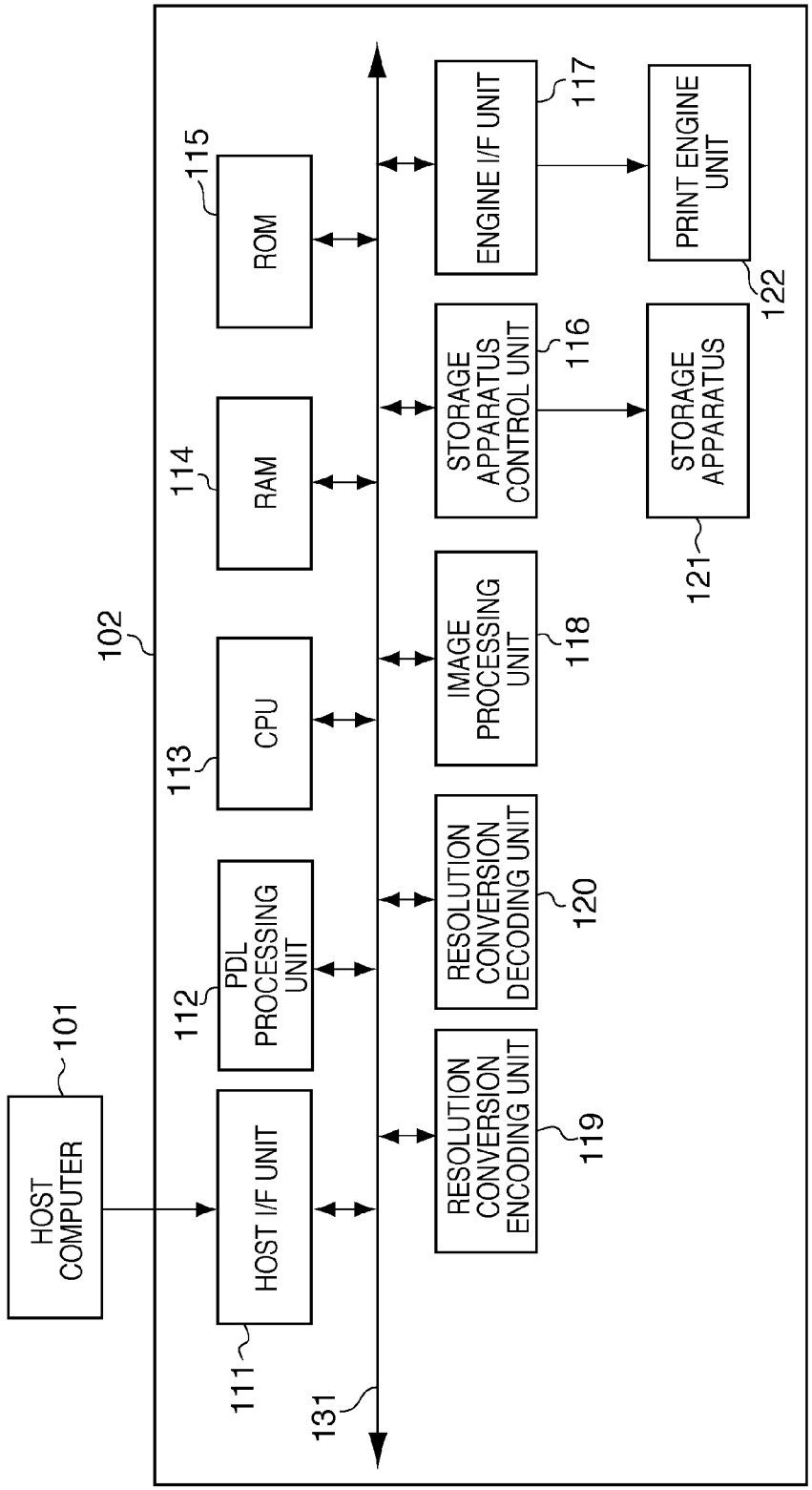

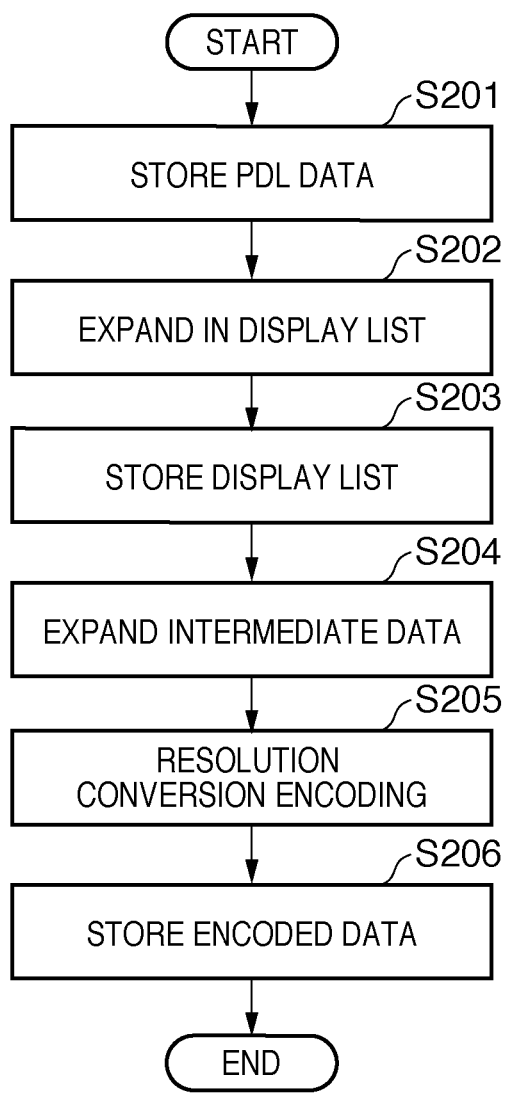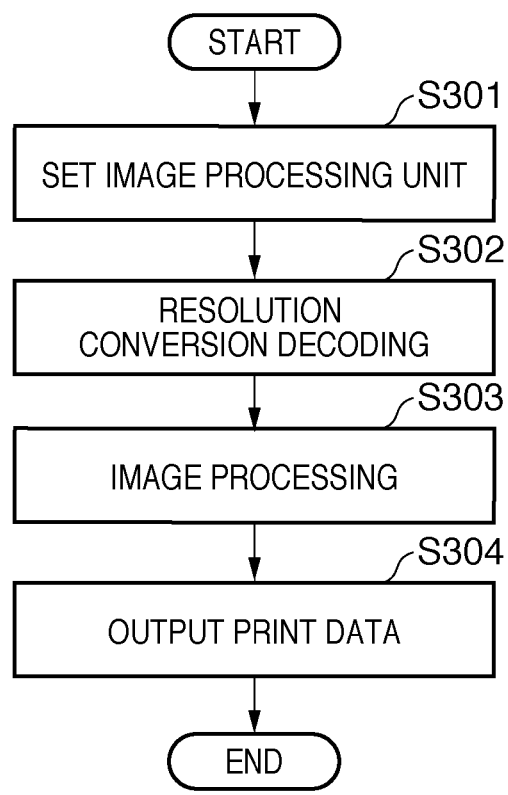

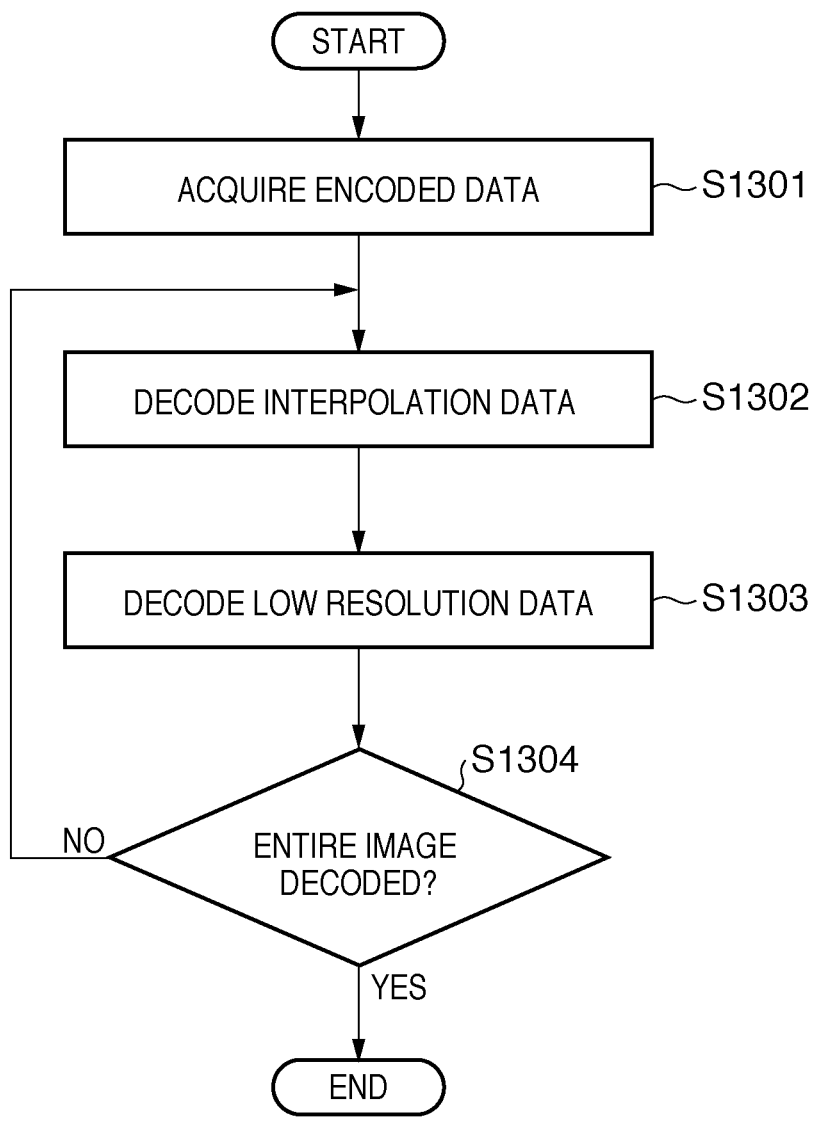

IMAGE PROCESSING APPARATUS AND PROCESSING METHOD THEREOF

BACKGROUND OF THE INVENTION

1. Field of the Invention

The present invention relates to an image processing apparatus and a processing method thereof.

2. Description of the Related Art

In recent years, there has been strong demand for high-resolution color images, and in response to calls for improved quality of these images, digital multifunction peripherals now handle images with resolutions of 1200 dpi (dots per inch) or more. With image processing apparatuses such as digital multifunction peripherals, memory and hard disk space are saved and the write time to these memories is shortened, by performing encoding compression when internally spooling image data to be handled by the apparatus, allowing reductions in cost and increases in speed to be achieved.

Here, JPEG schemes utilizing the discrete cosine transform and schemes utilizing wavelet transform are often used as compression schemes for still image data handled by an image processing apparatus. These encoding schemes encode an image in prescribed block units (for example, 8×8 or 16×16 pixels), and obtain a high compression efficiency by performing the discrete cosine transform, quantization and entropy coding.

Also, Japanese Patent Laid-Open No. 2004-104621 discloses an image coding apparatus that divides an image into small block unit areas (for example, 2×2 pixels), determines the representative color and interpolation representative color of the pixels constituting the blocks, and performs encoding at a fixed compression ratio by converting the resolution.

However, with an image processing apparatus that performs image processing after decoding encoding-compressed data that has undergone resolution conversion, there is a problem in that the compression efficiency decreases as shown below.

With an image processing apparatus, a pseudo-gradation process such as color conversion, filtering or dithering and a smoothing process are performed when printing, after decoding image data that has been encoding-compressed and spooled, after which image forming is performed. With smoothing, for example, edge enhancement is performed using a pixel interpolation process on edge portions of text and lines, which may lead to a decrease in resolution due to pixels in the block unit areas on which encoding compression is performed becoming thicker as a result of this pixel interpolation process. That is, pixels constituting a block that is determined to have a high resolution and is encoded at a low compression ratio when resolution conversion encoding is performed may become thicker low-resolution pixels due to the smoothing process, resulting in the high resolution determination when performing resolution conversion encoding being pointless.

SUMMARY OF THE INVENTION

The present invention provides an image processing apparatus and method that are capable of enhancing compression efficiency when performing resolution conversion encoding, by determining whether resolution will decrease due to pixel interpolation performed in downstream image processing.

According to an aspect of the present invention, there is provided an image processing apparatus for storing pixel data of an input image in a storage unit after performing resolution conversion encoding, and performing a pixel interpolation process after reading out the pixel data stored in the storage unit and performing resolution conversion decoding, comprising: a determination unit that determines, when resolution conversion encoding the pixel data of the input image, whether a resolution of the pixel data will decrease due to the pixel interpolation process, based on attribute information indicating an attribute of the pixel data; and a processing unit that performs processing to decrease the resolution of the pixel data in the resolution conversion encoding, if it is determined by the determination unit that the resolution of the pixel data will decrease.

Further features of the present invention will become apparent from the following description of exemplary embodiments (with reference to the attached drawings).

BRIEF DESCRIPTION OF THE DRAWINGS

FIG. 1 is a block diagram showing an overall configuration of an image processing system according to an embodiment.

FIG. 2 is a flowchart showing a process of encoding image data.

FIG. 3 is a flowchart showing a process of printing out image data.

FIG. 13 is a flowchart showing a resolution conversion decoding process.

DESCRIPTION OF THE EMBODIMENTS

Figure 4:
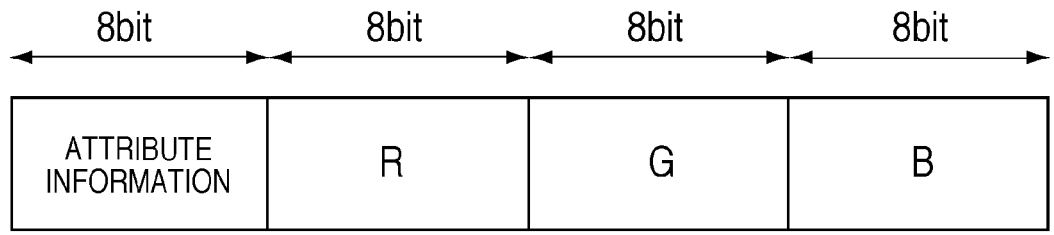
FIG. 4 is a diagram schematically showing a data format of pixels constituting intermediate image data.

An embodiment for implementing the present invention will now be described in detail with reference to the drawings.

FIG. 1 is a block diagram showing an overall configuration of an image processing system according to the present embodiment. As shown in FIG. 1, a host computer 101 and an image processing apparatus 102 constitute the image processing system.

The host computer 101 is a computer such as a personal computer (PC) or a work station (WS). An image, document or the like created on this computer is input to the image processing apparatus 102 as PDL data.

The image processing apparatus 102 receives data output from the host computer 101. That is, this means that a network capable of communicating data is formed between the image processing apparatus 102 and the host computer 101, although the configuration of this network is not particularly limited.

The image processing apparatus 102 performs various types of image processing based on data received from the host computer 101, and outputs image processed data to a print engine unit 122. Note that the processing performed by the image processing apparatus 102 will be discussed in detail later.

On the other hand, the print engine unit 122 performs a printing process on a storage medium such as paper, based on the image processed data output by the image processing apparatus 102. Note that in the present embodiment, data output to the image processing apparatus 102 is described as being from the host computer 101, but may be from another apparatus. For example, data output from a scanner input unit (not shown) may be input to the image processing apparatus 102.

Next, the configuration of the image processing apparatus 102 will be described in detail. This image processing apparatus 102 includes a host I/F unit 111, a PDL processing unit 112, a CPU 113, a RAM 114, a ROM 115, and a storage apparatus control unit 116. The image processing apparatus 102 further includes an engine I/F unit 117, an image processing unit 118, a resolution conversion encoding unit 119, a resolution conversion decoding unit 120, a storage apparatus 121, and the print engine unit 122.

The host I/F unit 111 functions as an interface for receiving PDL data output by the host computer 101. Note that the host I/F unit 111 differs according to the network linking the image processing apparatus 102 and the host computer 101, and is configured by an Ethernet (registered trademark), a serial interface or the like.

The PDL processing unit 112 performs a process of expanding PDL data received by the host I/F unit 111. The CPU 113 performs overall control of the image processing apparatus 102 using programs and data stored in the RAM 114 and the ROM 115, and executes the various processing performed by the image processing apparatus 102 (discussed later).

The RAM 114 is provided with an area for temporarily storing data received from the host computer 101 via the host I/F unit 111. The RAM 114 is also provided with a work area that is used when the CPU 113 is executing various types of processing.

The ROM 115 stores data and programs to be executed when the CPU 113 performs overall control of the image processing apparatus 102, setting data for the image processing apparatus 102, and the like. The storage apparatus control unit 116 performs control when image data handled by the image processing apparatus 102 is recorded to the storage apparatus 121. The engine I/F unit 117 performs a series of processes for outputting data image processed by the image processing apparatus 102 to the print engine unit 122.

The image processing unit 118 performs image processing on images composed of data output by the host computer 101, and particularly includes an image processing unit that performs a pixel interpolation process such as smoothing. Note that this image processing unit 118 will be discussed in detail later.

The resolution conversion encoding unit 119 performs a resolution conversion process on the image expanded in the PDL processing unit 112 per prescribed block unit area, and generates a lower resolution image than the input image and interpolation data obtained by encoding resolution conversion information.

The resolution conversion decoding unit 120 decodes the low resolution image data and interpolation data generated by the resolution conversion encoding unit 119, and generates a pre-encoding image. Note that the processing by the resolution conversion encoding unit 119 and the resolution conversion decoding unit 120 will be discussed in detail later.

The storage apparatus 121 is a mass storage medium such as a hard disk, and stores image data received by the image processing apparatus 102 from the host computer 101, and intermediate image data generated when processing is performed.

The abovementioned constituent elements are connected to each other by an internal bus 131 of the image processing apparatus 102. Data transfer between the constituent elements is performed using a data transfer unit (not shown) composed of a DMAC (Direct Memory Access Controller) provided between the constituent elements and the internal bus 131.

Next, processing performed by image processing apparatus 102 in the case where data is output from the host computer 101 to the image processing apparatus 102 will be described using the flowchart of FIG. 2. This processing is started by the CPU 113 detecting receipt of PDL data output from the host computer 101 via the host I/F unit 111.

In S201, the CPU 113 temporarily stores the received PDL data in the RAM 114. Next, in S202, the CPU 113 expands the stored PDL data in a display list (DL), and temporarily stores the display list in the RAM 114 in S203. Note that in S202, the CPU 113 generates image information of the PDL data and attribute information corresponding thereto, and stores the generated information in the DL. Here, examples of the attribute information that is generated include information indicating a PDL input character, a PDL input line and a PDL input photo.

Next, in S204, the PDL processing unit 112 performs an image expansion process based on the stored DL, and generates intermediate image data. The image information and attribute information corresponding thereto included in the DL are stored in the intermediate image data in association with each other in pixel units. In S205, this intermediate image data is converted to low resolution image data and interpolation data by the resolution conversion encoding unit 119, as will be discussed later in FIG. 12. The low resolution image data and interpolation data is output to the storage apparatus 121 via the storage apparatus control unit 116 in S206. Here, output of the low resolution image data and interpolation data is assumed to be performed by a data transfer unit (not shown) included in the storage apparatus control unit 116. One or more pages of low resolution image data and interpolation data are saved to the storage apparatus 121 according to the image data transmitted from the host computer 101.

Next, the process of reading out the low resolution image data and interpolation data saved in the storage apparatus 121, outputting the read data to the print engine unit 122, and performing printing will be described using the flowchart of FIG. 3. This processing is started by the CPU 113 issuing a print start command to the resolution conversion decoding unit 120 after receiving notification that spooling of the low resolution image data and interpolation data by the storage apparatus control unit 116 has ended.

In S301, the CPU 113 sets the image processing unit 118. Specifically, the CPU 113 writes required parameters to the registers of an image processing module (not shown) included in the image processing unit 118.

Next, in S302, the CPU 113 instructs that low resolution image data and interpolation data that was saved in the storage apparatus 121 be read out from the RAM 114 to the resolution conversion decoding unit 120. In the resolution conversion decoding unit 120, a data transfer unit (not shown) included therein outputs decoded intermediate image data to the RAM 114. In S303, the image processing unit 118 then performs image processing for printing out shown in FIG. 5 on intermediate image data read out by a data transfer unit (not shown) included therein from the RAM 114, and converts the intermediate image data to print data.

Next, in S304, the obtained print data is output to the print engine unit 122 via the engine I/F unit 117, after being output to the RAM 114 by the data transfer unit (not shown) included in the image processing unit 118.

The above processing enables data received from the host computer 101 to be resolution conversion encoded (discussed later in FIG. 12), and held as spool data composed of low resolution image data and interpolation data.

Figure 5:
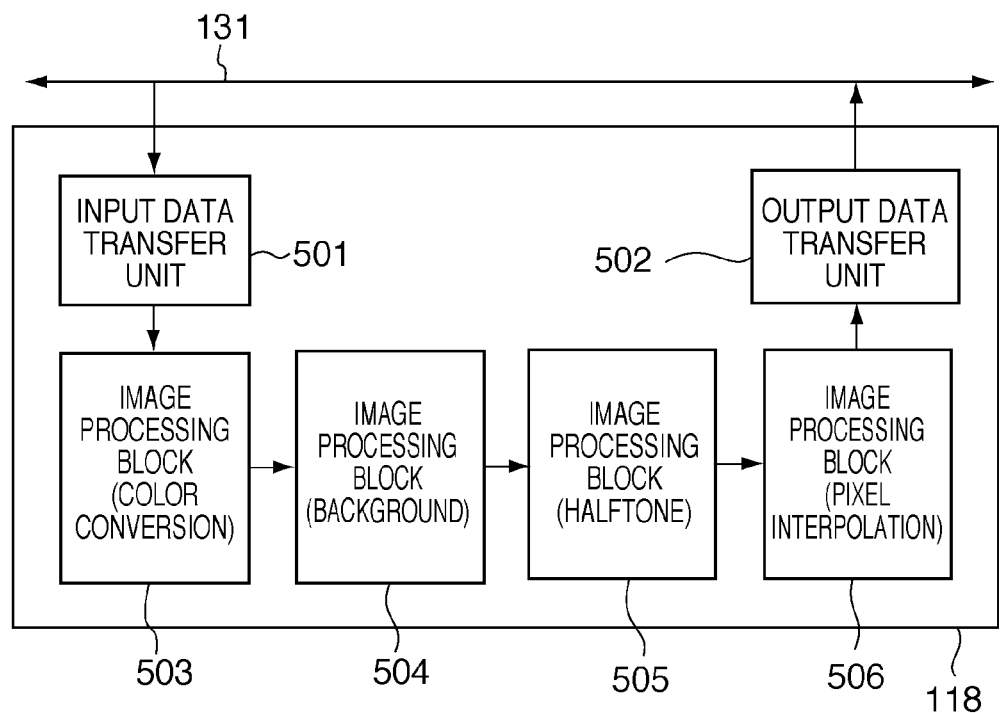
FIG. 5 is a block diagram showing a detailed configuration of an image processing unit 118.

Further, in the case where printing is performed based on spool data, resolution conversion decoding can be performed on the spool data to generate intermediate image data, and the result of performing image processing as shown in FIG. 5 can be output to the print engine unit 122.

Note that although spool data is assumed to be held in the storage apparatus 121, a configuration may alternatively be adopted in which spool data is held only in the RAM 114, and the result of executing resolution conversion decoding and image processing thereon is output to the print engine unit 122.

FIG. 4 is a diagram schematically showing a data format of pixels constituting intermediate image data. Here, the data of each pixel constituting the intermediate image data is constituted by image information indicating the bit depth for every color component, and attribute information, which is metadata, indicating information on the area and object (character object, line object, photo object) to which the pixel belongs in the image data. Specifically, the data length of the attribute information is 8 bits, and the respective data length of R, G and B serving as color components is 8 bits. Note that the data length of the attribute information, the data length of the image information, and the color space information is not limited thereto, and may be other data lengths and other color spaces.

Next, the configuration of the image processing unit 118 will be described in detail using the block diagram of FIG. 5. As shown in FIG. 5, the image processing unit 118 is constituted by blocks that perform data transfer and blocks that perform image processing. In the example of FIG. 5, the image processing unit 118 is assumed to be constituted by an input data transfer unit 501, an output data transfer unit 502 and image processing blocks 503 to 506. Here, the image processing blocks constituting the image processing unit 118 are assumed to include at least one block that performs a pixel interpolation process such as smoothing, with the image processing block 506 corresponding to this block.

As for the other image processing blocks 503 to 505, the image processing block 503 performs a color conversion process, the image processing block 504 performs a background process, and the image processing block 505 performs a halftone process. Note that the processing content and number of the image processing blocks is exemplary, and may be varied according to the image processing to be realized.

The input data transfer unit 501 is connected to the internal bus 131, and processing compatible data held in advance in the RAM 114, which is similarly connected to the internal bus 131, is loaded into the image processing unit 118. Here, the processing compatible data is intermediate image data generated by the resolution conversion encoding unit 119.

As for settings required for the operation by the input data transfer unit 501, the start address and data length of image information and attribute information constituting intermediate image data existing on the RAM 114 are set in a register (not shown) included in the image processing unit 118. It is assumed that the CPU 113 will perform the.

The output data transfer unit 502 is connected to the internal bus 131, and transfers image data processed by the image processing unit 118 to the RAM 114 connected to the internal bus 131. As for settings required for the operation by the output data transfer unit 502, the address and output data length of image information and attribute information of the page top pixel required in order to write image data to the RAM 114 are set in another register (not shown) included in the image processing unit 118. It is assumed that the CPU 113 will perform the.

The image processing blocks 503 to 506 perform image processing unique to each image processing block on image data output from the input data transfer unit 501 in a pipeline, and output the processing result to the output data transfer unit 502.

Figure 6:
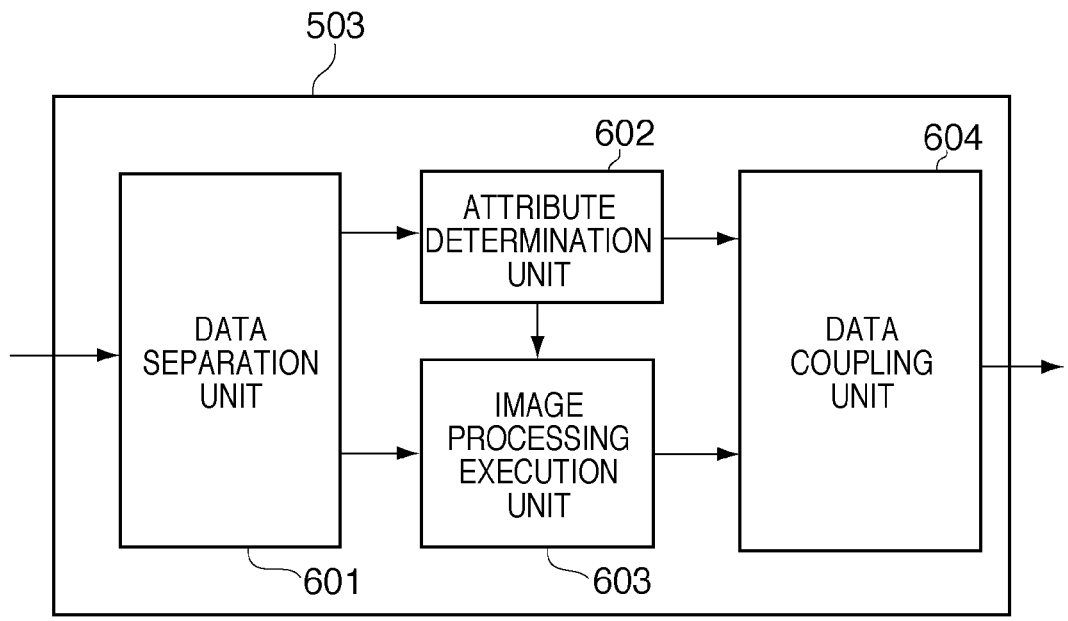
FIG. 6 is a diagram showing an internal configuration of an image processing block.

FIG. 6 shows an internal configuration of the image processing blocks. A data separation unit 601 analyzes input image data, and after separating the pixel data into image information and attribute information, outputs the image information to an image processing execution unit 603 and the attribute information to an attribute determination unit 602.

The attribute determination unit 602 determines the attribute of the pixel data and outputs the determination result to the image processing execution unit 603, together with outputting input attribute information to a data coupling unit 604. The image processing execution unit 603 selects preset values relating to image processing execution (not shown), according to the determination result, and after executing prescribed image processing on the corresponding image information, outputs image information forming the processing result to the data coupling unit 604.

The data coupling unit 604 couples the attribute information input from the attribute determination unit 602 and the image information forming the processing result input from the image processing execution unit 603, and outputs the coupled data to the downstream image processing block. Note that while the implementation of the image processing execution unit 603 differs respectively according to the processing of each image processing block, the configuration in the other blocks is similar.

Figure 7:
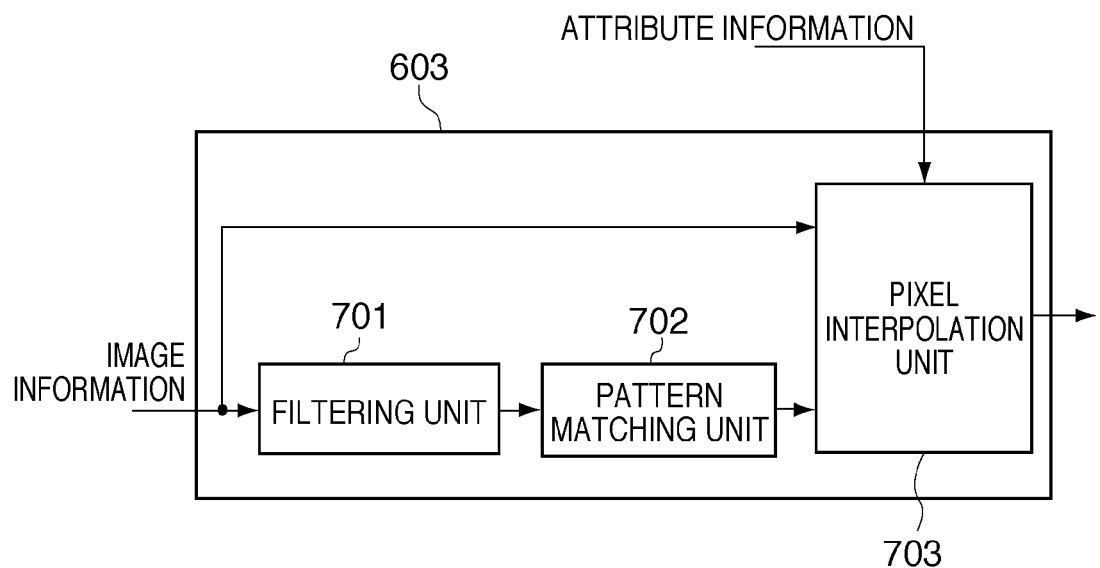
FIG. 7 is a diagram showing a configuration of an image processing execution unit 603 in an image processing block 506.

FIG. 7 is a diagram showing the configuration of the image processing execution unit 603 in the image processing block 506. In this image processing block 506, the image processing execution unit 603 executes a pixel interpolation process. A filtering unit 701 performs a smoothing/filtering process on image information input from the data separation unit 601 of the image processing block 506. Specifically, the filtering unit 701 performs a filtering operation referenced on neighboring pixels of the pixel of interest using pixels accumulated in a line buffer (not shown) provided in the image processing block 506 and input pixels. The line buffer is long enough to be able to hold the maximum number of pixels in the main scanning direction, and the number of lines is one less than the number in the sub scanning direction of the neighboring pixel reference area. In this example, the neighboring pixel reference area is assumed to be 3×3 pixels in size, giving a line buffer length of 2 lines. Also, each filtering coefficient relating to the filtering operation is a value preset in a register (not shown) provided in the image processing block 506.

A pattern matching unit 702 performs a pattern matching process on a 3×3 pixel area formed using pixels output from the filtering unit 701 and accumulated in a second internal buffer (not shown) whose size in the main scanning direction is 2 lines, and the next line of pixels. If matched, matching pattern information is set to true and output to a pixel interpolation unit 703 together with the pixel data.

On the other hand, if not matched, matching pattern information is set to false and output to a pixel interpolation unit 703. Here, patterns preset in a lookup table (LUT; not shown) provided in the image processing block 506 are assumed to be used as pattern data for matching.

The pixel interpolation unit 703 determines whether to perform pixel interpolation, according to the matching pattern information output from the pattern matching unit 702 and the attribute information output from the attribute determination unit 602, and performs pixel interpolation.

Figure 8:
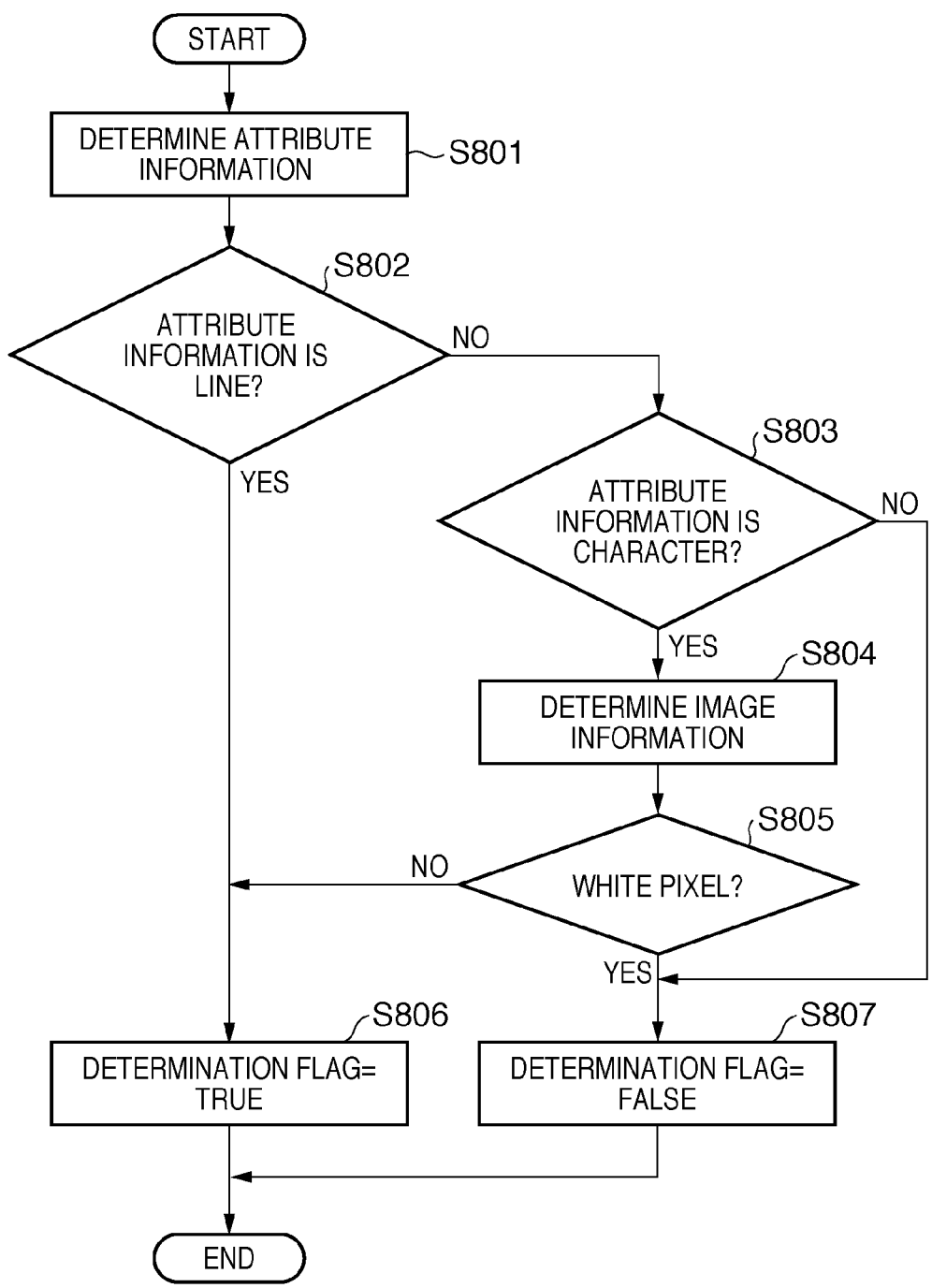
FIG. 8 is a flowchart showing a pixel interpolation determination process.

FIG. 8 is a flowchart showing a process of determining whether to perform pixel interpolation. This process is executed when image information from the data separation unit 601, matching pattern information output from the pattern matching unit 702 corresponding thereto, and attribute information are input to the pixel interpolation unit 703.

In S801, S802 and S803, determination of the attribute information is performed. If the attribute information is determined to indicate a line, the processing transits to S806, where the determination flag relating to pixel interpolation execution is set to true, and the pixel interpolation determination process is ended. On the other hand, if the attribute information is determined to indicate a character, the processing transits to S804. At S804 and S805, it is determined whether the image information is a white pixel. If it is determined to be a white pixel, the processing transits to S807, where the determination flag is set to false, and the pixel interpolation determination process is ended. If it is determined to not be a white pixel, the processing transits to S806, where the determination flag is set to true, and the pixel interpolation determination process is ended.

Also, if, in the abovementioned S802 and S803, the attribute information does not indicate a line or a character, the processing transits to S807, where the determination flag is set to false, and the pixel interpolation determination process is ended.

The pixel interpolation unit 703 outputs pixel data received from the pattern matching unit 702 as the pixel interpolation result if the determination flag and the matching pattern information are both true. However, if the either the determination flag or the matching pattern information is false, the pixel interpolation unit 703 outputs the image information input from the data separation unit 601 without performing the pixel interpolation process.

As a result of the processing described above, the pixel interpolation process is only performed in the image processing execution unit 603 of the image processing block 506 in the case of a line or a character that is not a white pixel, and there being a match with a prescribed pattern, and the pixel interpolation process is not performed in other cases.

Figure 9:
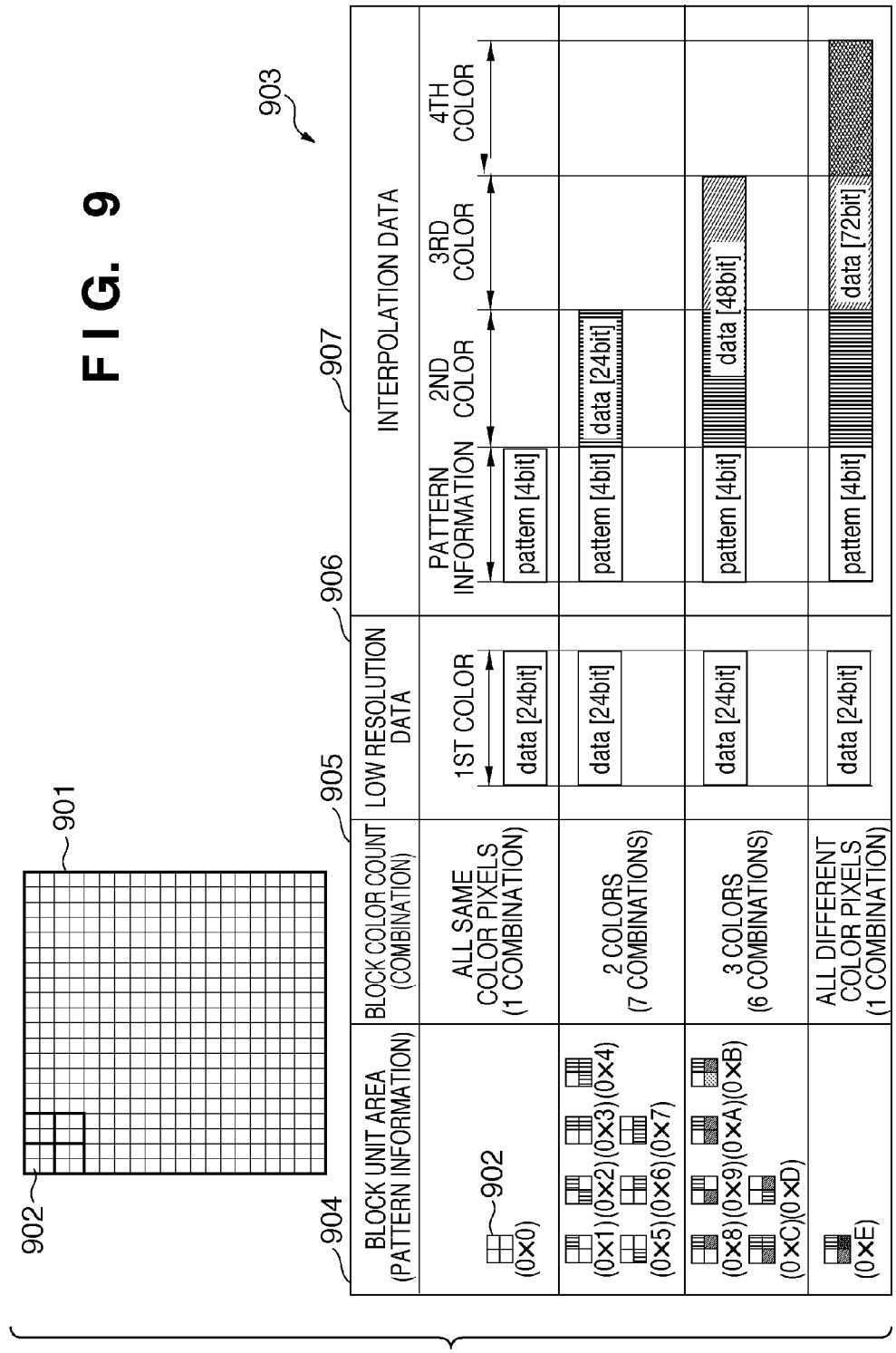
FIG. 9 is a diagram for describing a resolution conversion encoding process.

Next, the encoding process performed by the resolution conversion encoding unit 119 will be described using FIGS. 9 to 12. As shown in FIG. 9, 2×2 pixel blocks 902 are extracted from an input image 901, and low resolution data and interpolation data are output after performing encoding conversion (compression) in block units. Reference numeral 903 shown in FIG. 9 is a table showing the relation between a block unit area (pattern information) 904, a number of colors (combination) 905 constituting a block, corresponding low resolution data 906, and interpolation data 907.

Firstly, the relation between the block unit area 904 and the number of colors 905 constituting a block will be described. There is one combination in the case where the block color count 905 is one color and all the pixels are the same color. The pattern information corresponding thereto is given as 0x0 in hexadecimal form.

Next, excluding the case where all four pixels are the same color, there are seven combinations in the case where the block color count 905 is two colors, because when the upper left pixel is considered as the first color and the other color is considered as the second color, the three pixels other than the upper left pixel take the first or second color. The pattern information corresponding thereto is given as 0x0 to 0x7 in hexadecimal form.

The combinations in the case where the block color count 905 is three colors can be rephrased as being the number of combinations in the case where only one of the three colors is used twice, and can be obtained by deriving the number of combinations in the case where two of the four pixel coordinates will be the same color. In other words, the number of combinations in the case of three colors will be the number of combinations taking two of the four coordinates, giving a total of six combinations. The pattern information corresponding thereto is given as 0x8 to 0xD in hexadecimal form.

Further, there is one combination in the case where the block color count 905 is four colors, similarly to the case of one color. The pattern information corresponding thereto is given as 0xE in hexadecimal form.

Thus, in the case of 2×2 pixel blocks 902, there will be 15 combinations in total in the case of all of the block color counts 905 from 1 to 4 colors.

Next, configurations of low resolution data 906 and interpolation data 907 corresponding to the block color count 905 will be described. If the low resolution data 906 is assumed to be the color information of the upper left pixel of a block 902 composed of 2×2 pixels, the bit length of the color information can be represented by 24 bits in the case where the color space is RGB and the data length of each color component of the pixels is 8 bits, for example. Also, the color information of this upper left pixel is given as the first color, and hereinafter the upper right pixel will be given as the second color, the bottom right pixel will be given as the third color, and the bottom left pixel will be given as the fourth color.

The interpolation data 907 is constituted by pattern information and color information that depend on the block 902. For example, in the case of the block color count 905 being one color, the interpolation data 907 is constituted by 0x0 as pattern information and color information representing one color. Here, the bit length of the pattern information is 4 bits, which is the minimum bit length representing all (15) combinations of the block color count 905.

If the color information is the color information of the remaining three (second to fourth) of the 2×2 pixels constituting a block 902 other than the upper left pixel, the bit length of the color information will be 24 bits in the case where the color space is RGB and the data length of each color component of the pixels is 8 bits, for example.

Using the low resolution data 906 and the interpolation data 907, as described above, enables blocks 902 composed of 2×2 pixels to be compression encoded. For example, in the case where a block 902 is all same color pixels, the data amount before compression encoding is 96 bits for 4 pixels of 8-bit RGB data. When this block of same color pixels is compression encoded, the low resolution data indicating the color information will be 24 bits and the pattern information indicating that all pixels are the same color will be 4 bits, giving a total of 28 bits. Also, compression-encoded data can be decoded into a 2×2 pixel block 902 constituting the original data shown in the block unit area 904 from the interpolation data (pattern information and color information) 907.

Figure 10:
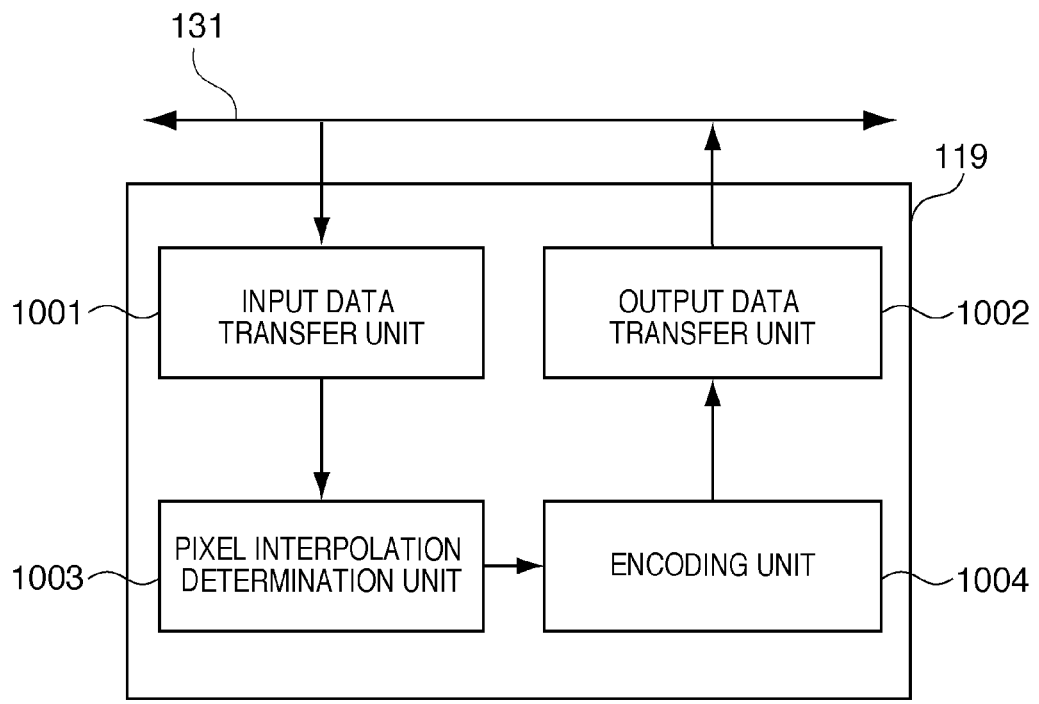
FIG. 10 is a block diagram showing a configuration of a resolution conversion encoding unit 119.

Next, the configuration and operation of the resolution conversion encoding unit 119 will be described using the block diagram of FIG. 10. An input data transfer unit 1001, which is connected to the internal bus 131, transfers processing compatible data held in advance in the RAM 114 to the resolution conversion encoding unit 119, clips data in a prescribed pixel area, and outputs the clipped data to a pixel interpolation determination unit 1003. Here, the processing compatible data is intermediate image data generated by the PDL processing unit 112.

In order to perform the operation by the input data transfer unit 1001, the start address, data length and pixel clipping size of the image information and attribute information constituting the intermediate image data existing on the RAM 114 are set in a register (not shown) included in the resolution conversion encoding unit 119. Note that it is assumed that the CPU 113 will perform the register.

An output data transfer unit 1002 is connected to the internal bus 131, and transfers encoded data generated by the resolution conversion encoding unit 119 to the RAM 114 connected to the internal bus 131. As for settings required for the operation by the output data transfer unit 1002, the address and output data length of the image information and attribute information of the page top pixel, required for writing image data to the RAM 114, are set in another register (not shown) included in the resolution conversion encoding unit 119. Note that it is assumed that the CPU 113 will perform the.

The pixel interpolation determination unit 1003 performs a pixel interpolation determination process on the intermediate image data from the input data transfer unit 1001 by using a similar configuration to the abovementioned image processing execution unit 603, and generates a determination result.

Figure 11:
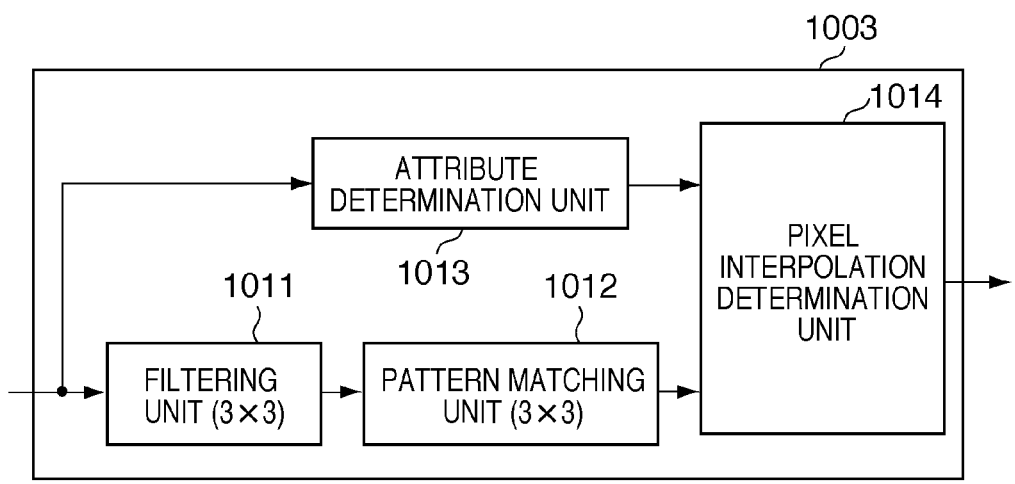
FIG. 11 is a block diagram showing a configuration of a pixel interpolation determination unit 1003.

FIG. 11 is a block diagram showing a configuration of the pixel interpolation determination unit 1003. The pixel interpolation determination unit 1003 is constituted by a filtering unit 1011, a pattern matching unit 1012, an attribute determination unit 1013, and a pixel interpolation determination unit 1014. The processing respectively performed by the filtering unit 1011, the pattern matching unit 1012 and the attribute determination unit 1013 is the same as the abovementioned processing by the image processing execution unit 603. Also, the neighboring pixel reference areas are also respectively the same size, 3×3 pixels. Therefore, the determination result obtained by the pixel interpolation determination unit 1003 indicates whether the corresponding pixel will be interpolated by the image processing block 506 positioned downstream.

Returning to FIG. 10, an encoding unit 1004 performs a resolution conversion encoding process, according to the determination result relating to pixel interpolation by the pixel interpolation determination unit 1003.

Figure 12:
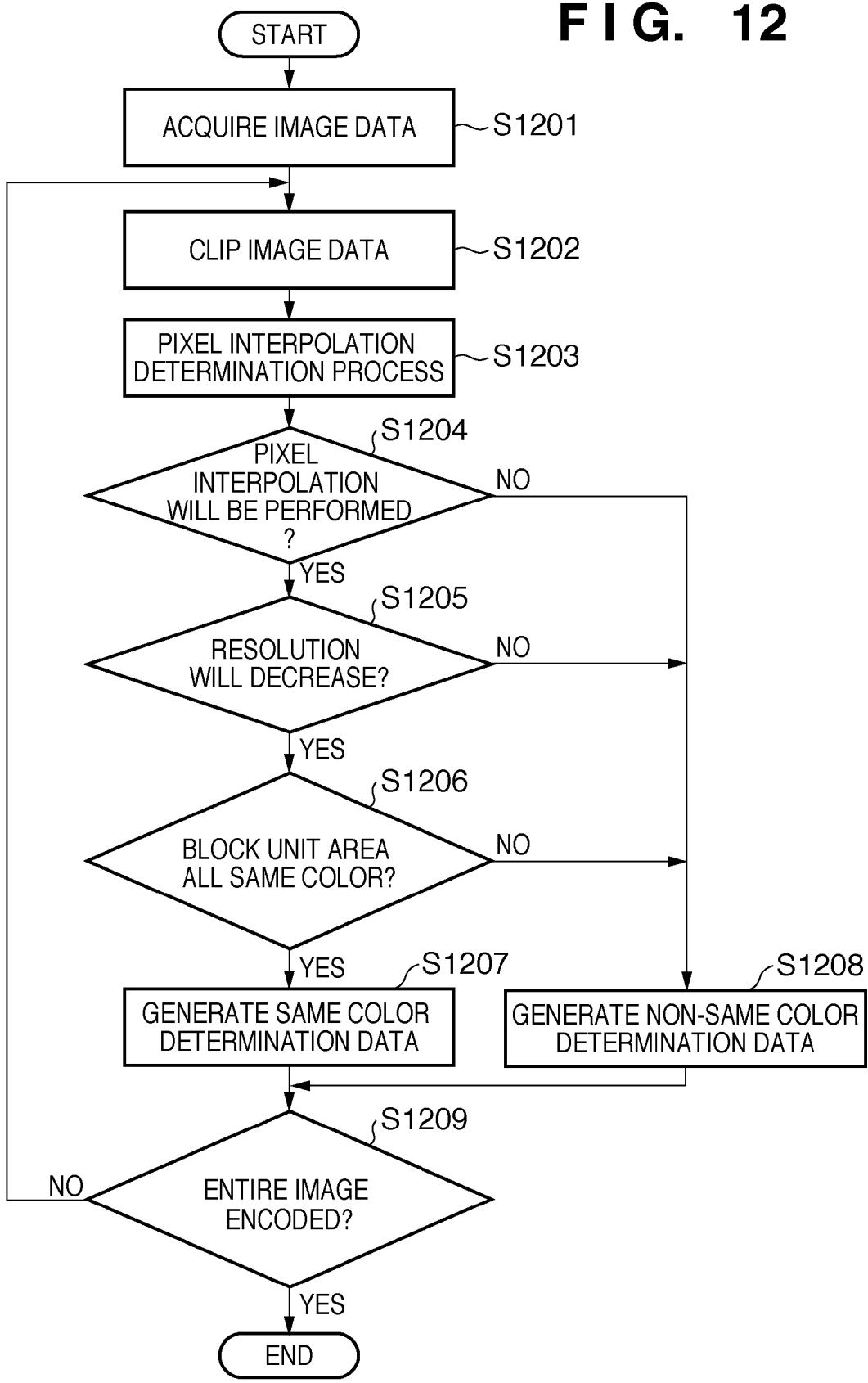
FIG. 12 is a flowchart showing a resolution conversion encoding process.

Next, the encoding process performed by the resolution conversion encoding unit 119 will be described using the flowchart of FIG. 12. This processing is started by the CPU 113 instructing the resolution conversion encoding unit 119 to receive intermediate image data generated by the PDL processing unit 112.

In S1201, image data for performing the resolution conversion encoding process is acquired. Specifically, intermediate image data input from the host computer 101 and stored in the storage apparatus 121 after being converted by the PDL processing unit 112 is acquired using the input data transfer unit 1001. The acquired image data is stored in an internal buffer (not shown) included in the resolution conversion encoding unit 119.

Next, in S1202, the input data transfer unit 1001 performs clipping on the acquired intermediate image data in a first block unit area. The maximum size of the first block unit area is the size of the pixel reference areas of the neighboring pixel reference process performed by the pixel interpolation determination unit 1003, with the area size in this example being 3×3 pixels (9 pixels).

The following processing of S1203 to S1205 is assumed to be performed by the pixel interpolation determination unit 1003. Firstly, at S1203, a pixel interpolation determination process is performed for the clipped first block unit area. This pixel interpolation determination process, which is similar to the pixel interpolation determination process (S801 to S807) in the abovementioned pixel interpolation process performed by the image processing block 506, generates a determination flag relating to pixel interpolation as the determination result.

Next, at S1204 and S1205, it is determined whether pixel interpolation will be performed and whether the resolution will decrease, according to the determination flag generated at S1203. Firstly, if, at S1204, the determination flag is false, the processing transits to S1208. On the other hand, if the determination flag is true, the processing transits to S1205, where it is determined whether the resolution of the first block unit area will decrease. Specifically, the pieces of image information of the 3×3 pixels constituting the first block unit area are compared with each other, and if the pieces of pixel information are all the same color, the first block unit area is determined to be a low resolution pixel area whose resolution will decrease, and the processing transits to S1206. On the other hand, if the pieces of pixel information are not all the same color, the first block unit area is determined to be a high resolution pixel area whose resolution will not decrease, and the processing transits to S1208.

The following processing of S1206 to S1208 is assumed to be performed by the encoding unit 1004. Firstly, at S1206, the color information of each pixel constituting a second block unit area forming processing units of the resolution conversion encoding is referenced, and it is determined whether the second block unit area is constituted by same color pixels. The second block unit area is a pixel unit area for performing the resolution conversion encoding process, and is here 2×2 pixels. This is a small size differing from the first block unit area of 3×3 pixels clipped by the input data transfer unit 1001. Thus, the encoding unit 1004 is provided with an internal buffer (not shown) capable of holding 3×3 pixels of data, and holds input image data while performing the encoding process. Note that the size of the internal buffer is exemplary, and processing efficiency may be increased by doubling the buffers capable of holding 3×3 pixels of data and performing double buffering.

In this processing, the respective image information of the 2×2 pixels (=4 pixels) constituting the second block unit area are compared for each component, and it is determined whether they all match. If the determination result is true, the processing transits to S1207, and if the determination result is false, the processing transits to S1208.

At S1207, having determined that the pixels constituting the second block unit area are all the same color, low resolution image data 906 and interpolation data 907 corresponding thereto are generated (resolution is decreased, reducing the data amount and enhancing the encoding compression efficiency). Specifically, color information for the 2×2 pixels constituting the second block unit area is generated as the low resolution data. Also, 0x0, which is the value of pattern information indicating that the second block unit area is all same color pixels, is generated as the interpolation data. After the low resolution data and the interpolation data are generated, the processing transits to S1209.

On the other hand, at S1208, having determined that the pixels constituting the second block unit area are not all the same color, low resolution image data and interpolation data corresponding thereto are generated. Color information for the upper left pixel of the 2×2 pixels constituting the second block unit area is generated as the low resolution data. Pattern information and color information of the second to fourth colors that depend on the number of colors constituting the block unit area are generated as the interpolation data.

Specifically, if the second block unit area has two colors, one of 0x1 to 0x7 is generated as the value of the pattern information, and color information for the 2×2 pixels other than the upper left pixel is generated as the color information of the second color. If the second block unit area has three colors, one of 0x8 to 0xD is generated as the value of the pattern information, color information for the 2×2 pixels other than the upper left pixel is generated as the color information of the second color, and color information for remaining pixels that are not the upper left pixel or the second color is generated as the color information of the third color. If the second block unit area has four colors, 0xE is generated as the value of the pattern information, color information for the 2×2 pixels other than the upper left pixel is generated as the color information of the second color, color information for the remaining pixel that is not the upper left pixel or the second color is generated as the color information of the third color, and color information for the remaining pixel that is not the upper left pixel, the second color or the third color is generated as the color information of the fourth color.

After the low resolution data and the interpolation data are generated, the processing transits to S1209. At S1209, it is determined whether the entire image acquired at S1201 has been encoded. If the determination result is false, the processing transits to S1202, and the encoding process is performed on the remaining second block unit areas. On the other hand, if the determination result is true, the resolution conversion encoding process is ended.

Next, the decoding process performed by the resolution conversion decoding unit 120 will be described using the flowchart shown in FIG. 13. This decoding process is started by the CPU 113 issuing a print start command to the resolution conversion decoding unit 120, after spooling of encoded data composed of low resolution image data and interpolation data by the storage apparatus control unit 116 has ended.

In S1301, resolution conversion-encoded data is acquired. Specifically, low resolution image data and interpolation data that were encoded in the resolution conversion encoding unit 119 and stored in the storage apparatus 121 are acquired using a data transfer unit (not shown) provided in the resolution conversion decoding unit 120, and the processing transits to S1302. At S1302, the acquired interpolation data is decoded for each of the second block unit areas, and pattern information is generated.

Next, in S1303, low resolution image data corresponding to the pattern information decoded at S1302 is decoded per second block unit area, and intermediate image data constituting the original data is generated. Next, in S1304, it is determined whether the entire image acquired at S1301 has been decoded. If the determination result is false, the processing transits to S1302, and the decoding process is performed on the remaining encoded data that was acquired. On the other hand, if the determination result is true, the resolution conversion decoding process is ended.

According to the present embodiment, whether a prescribed block unit area is to undergo pixel interpolation in downstream image processing can be determined when performing an encoding conversion (compression) process using resolution conversion. A block unit area that is high resolution at the time of the encoding conversion (compression) process but will become low resolution after the encoding process can then be determined and a low resolution determination can be made, enabling encoding compression efficiency to be enhanced. Not only can encoding compression efficiency be enhanced, but data can thereby also be correctly decoded.

Variations of the Present Embodiment

Next, a variation in which the reference area of the neighboring pixel reference process performed by the pixel interpolation determination unit 1003 of the resolution conversion encoding unit 119 in the present embodiment is reduced in size will be described. Specifically, the reference area is reduced to the same 2×2 pixel size as the predetermined block unit area in the resolution conversion encoding process. Implementation of the pixel interpolation determination unit 1003 can thereby be facilitated.

In the variation of the present embodiment, the neighboring pixel reference areas of the filtering unit 1011 and the pattern matching unit 1012 are respectively 2×2 pixels, facilitating implementation of the various processing, and enabling implementation costs such as circuit size and the like to be reduced. Specifically, the internal buffer size (not shown) for holding neighboring pixels in the various processing is reduced to at least half that in the case of 3×3 pixels.

Also, the size of the LUT relating to the holding of patterns can be reduced to at least half that in the case of 3×3 pixels since the pattern size in the pattern matching unit 1012 is reduced. Further, the internal buffer amount (not shown) for holding input image data in the encoding unit 1004 is also reduced. While accuracy relating to the respective processing decreases by an amount equal to the neighboring pixel reference area, pixel interpolation determination can be performed when the resolution conversion encoding process is performed.

According to the variation of the present embodiment, the reference area of the neighboring pixel reference process performed by the pixel interpolation determination unit 1003 of the resolution conversion encoding unit 119 is reduced to the size as the block unit area of the resolution conversion encoding process to facilitate implementation, and a determination relating to pixel interpolation in downstream image processing can be performed. A block unit area that is high resolution at the time of the encoding conversion process but will become low resolution due to image processing downstream of the encoding process can then be determined and a low resolution determination can be made, enabling encoding compression efficiency to be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296380, filed Dec. 25, 2009, which is hereby incorporated by reference herein in its entirety.

What is claimed is:

1. An image processing apparatus comprising:
at least one processor configured to function as:
a resolution conversion encoding unit that generates a low resolution image and interpolation data by performing resolution conversion encoding for an input image;
a control unit that stores the generated low resolution image and the generated interpolation data in a storage unit;
a resolution conversion decoding unit that generates a decoded image by performing resolution conversion decoding for the stored low resolution image and the stored interpolation data; and an image processing unit that performs image processing for the decoded image generated by the resolution conversion decoding unit, wherein the image processing includes a pixel interpolation process, and wherein the resolution conversion encoding unit includes:
  a determination unit that determines whether each of 2×2 pixel blocks of the input image will be interpolated by the pixel interpolation process of the image processing unit, based on attribute information indicating an attribute of pixel data of the input image; and
  an encoding unit that generates the low resolution image and the interpolation data by performing the resolution conversion encoding for the input image, wherein the encoding unit generates the low resolution image and the interpolation data indicating that a 2×2 pixel block has pixels that are all a same color as each other if it is determined by the determination unit that the 2×2 pixel block will be interpolated.

2. The apparatus according to claim 1, wherein the determination unit determines that the 2×2 pixel blocks of the input image will be interpolated by the pixel interpolation process if the attribute information indicates one of an attribute of a line and an attribute of a character that is not a white pixel.

3. A processing method of an image processing apparatus, comprising:
  a resolution conversion encoding step of generating a low resolution image and interpolation data by performing resolution conversion encoding for an input image;
  a control step of storing the generated low resolution image and the generated interpolation data in a storage unit;
  a decoding step of generating a decoded image by performing resolution conversion decoding for the stored low resolution image and the stored interpolation data; and
  an image processing step of performing image processing for the decoded image generated in the decoding step, wherein the image processing includes a pixel interpolation process, and wherein the resolution conversion encoding step includes:
  a determining step of determining whether each of 2×2 pixel blocks of the input image will be interpolated by the pixel interpolation process in the image processing step, based on attribute information indicating an attribute of pixel data of the input image; and
  an encoding step of generating the low resolution image and the interpolation data by performing the resolution conversion encoding for the input image, wherein the encoding step generates the low resolution image and the interpolation data indicating that a 2×2 pixel block has pixels that are all a same color as each other if it is determined in the determination step that the 2×2 pixel block will be interpolated.

4. A non-transitory computer-readable recording medium storing a computer program that when executed causes a computer to perform the processing method of the image processing apparatus set forth in claim 3.

* * * * *